United States Patent [19]
Herbert

[11] 4,148,563
[45] Apr. 10, 1979

[54] TRANSPARENT OR REFLECTIVE PANEL

[76] Inventor: Edward Herbert, Rte. 44, Canton, Conn. 06019

[21] Appl. No.: 683,829

[22] Filed: May 6, 1976

[51] Int. Cl.² ........................................... G05D 25/00
[52] U.S. Cl. ..................................... 350/285; 350/363
[58] Field of Search ............... 350/160 R, 161 S, 285, 350/267, 279, 295, 359, 363; 126/270, 271

[56] References Cited

U.S. PATENT DOCUMENTS

| | | | |
|---|---|---|---|
| 2,281,280 | 4/1942 | Gabor | 350/161 S X |
| 3,238,296 | 3/1966 | Nelson et al. | 350/161 S X |
| 3,254,342 | 5/1966 | Miller | 350/295 X |
| 3,415,591 | 12/1968 | Letter | 350/160 R |
| 3,612,653 | 10/1971 | Rajchman | 350/160 R |
| 3,614,202 | 10/1971 | Letter | 350/160 R |

OTHER PUBLICATIONS

Taylor, Applied Optics, vol. 11, No. 3, Mar. 1972, pp. 586-593.
Taylor, Proceedings of the IEEE, vol. 61, No. 2, Feb. 1973, pp. 148-154.

Primary Examiner—F. L. Evans

[57] ABSTRACT

A transparent or reflective panel is comprised of two or more layers of transparent material. The outermost surfaces of the panel are plane. The inner surface of the first layer of the panel is configured so as to form a reflector, as for example, the familiar half-cubic reflector. The second layer is shaped so as to closely conform to the first layer, and the two layers are sealed together at the edges. Between the layers is a fluid, which will be either a vapor or a liquid depending upon temperature. When it is a vapor, light incident upon the panel will be reflected. When the vapor condenses to a liquid, the resulting vacuum pulls the layers of the panel closely together, and the liquid condensate fills whatever spaces may remain between the layers. This provides an optical continuum through the panel, and it will be transparent. The amount of fluid is carefully controlled to ensure that the panel will not distend excessively at high temperature. In another configuration, the second layer of the panel is an opaque absorber plate. The panel will then either absorb or reflect light as a function of temperature.

7 Claims, 7 Drawing Figures

TRANSPARENT OR REFLECTIVE PANEL

BACKGROUND OF THE INVENTION

This invention relates to solar collectors, greenhouses, skylights, and any other application receiving sunlight wherein it would be desirable to no longer absorb sunlight if a particular temperature is exceeded.

Most applications in which it is desired to reflect sunlight above a given temperature have relied upon shutters or louvers, which may be automatically operated.

Some applications have employed a liquid which flooded an optical system to alter its properties, and at least one has relied upon the boiling point of the liquid to cause the transition in properties. However, these systems have used copious quantities of liquid, which requires external reservoirs, plumbing and controls, and they are complex, heavy, bulky and expensive, and would present a serious contamination problem if damaged.

OBJECTS OF THE INVENTION

It is an object of this invention to provide a light weight, simple and inexpensive panel which transmits or absorbs light up to some temperature, and which reflects light at higher temperatures.

It is a further object of the invention to provide a temperature sensitive transparent or reflective panel which would be self contained, and which would minimize contamination problems if damaged.

SUMMARY OF THE INVENTION

An optical system is designed to be reflective, using the well known principle of total internal reflection. The exact nature of the optical system is not important, but it will normally comprise a transparent layer of material with a contoured reverse side, although it could be a complex, multilayered system.

Additional layers, filler strips, and what not are then provided which essentially fill the voids and level the contour of the optical system. However, sufficient spacing is maintained so that the optical properties of the reflective optical system are not compromised.

Sealing means are provided, and the air is purged from the optical system and replaced by a vapor. Upon cooling, the vapor will condense, thereby creating a vacuum which will pull the layers of the optical system together, making it no longer reflective. The condensate helps fill any voids.

BRIEF DESCRIPTION OF THE DRAWINGS

FIG. 1 illustrates the "cold" condition, with liquid between the layers, and FIG. 2 illustrates the "hot" condition, with vapor separating the layers.

DESCRIPTION OF THE INVENTION

Figure 1:
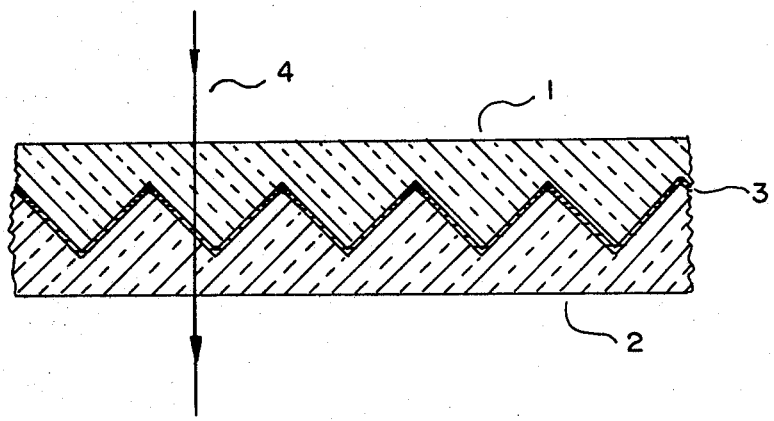
FIG. 1 and FIG. 2 illustrate the principle of the invention.
Figure 2:
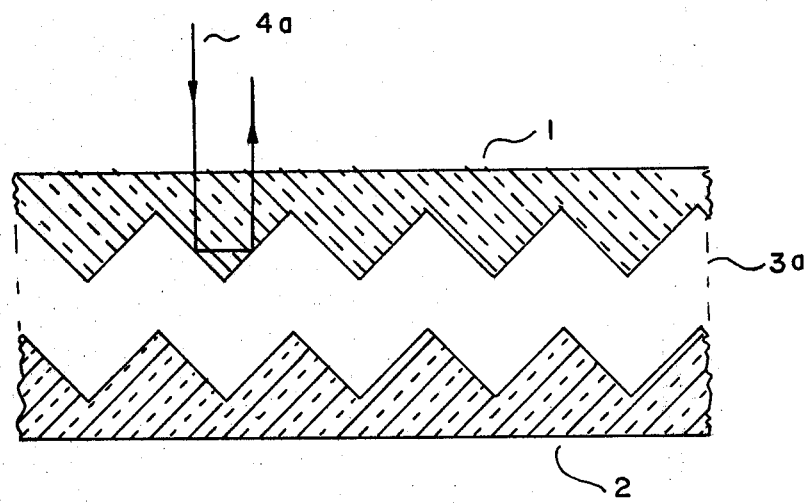

Attention is drawn to FIG. 1 and FIG. 2. A first layer 1 of transparent material is shaped on its bottom surface so as to be a reflector due to internal reflection. The contour as drawn has "V" shaped ridges, with a 90° included angle. A second layer 2 of transparent material has corresponding ridges which fit very closely with the ridges of the first layer 1.

In FIG. 1, a film of liquid 3 is shown between the layers 1 and 2. If the index of refraction of the liquid 3 is nearly that of the layers 1 and 2, then an incident ray of light 4 will be transmitted.

In FIG. 2, the bottom side of the first layer 1 of transparent material is in vapor 3a, and the incident ray of light 4a will be reflected, for any small angle from normal to the panel.

The refractive index of the liquid 3 is not critical. Most liquids have an index between 1.3 and 1.7. Transparent materials range from 1.4 to 1.7, with certain exotic materials being outside that range. For applications where the main objective is simply to transmit or reflect light, a mismatch of several tenths in refractive index would be tolerable. In a precision optical system or a window, a closer match would be desirable.

Material compatability is probably the most important criterian, particularly with plastics, but that is obvious, and dwelling upon it does not add to the teaching of the invention.

The boiling point of the liquid 3 determines the temperature at which the panel becomes reflective. However, this is not necessarily as simple as it might seem. If the mating surfaces are not well matched, it might require a fairly strong vacuum to pull them together, and the resulting reduced pressure would lower the boiling point, and the panel would be in transition over a range of temperature.

Another problem with the liquid might be that there could be insufficient condensate to fill all of the voids between the mating surfaces. Adding more liquid would result in there being too much vapor, which would burst the panel. If one or both of the layers is elastic, this problem will not exist.

If both layers are unyeilding, and there is not sufficient condensate to fill all of the voids, then the liquid can be extended with a nonvolatile liquid. This extender liquid must have a low surface tension and wet very well and must be used in minimal quantities so that it does not alter the optical shape of the reflective system or form bridges across the intended vapor gap.

Figure 3:
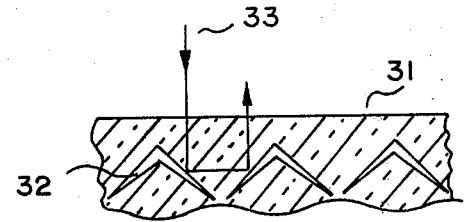
FIG. 3 shows a construction wherein the optical system consists of voids molded into a flexible transparent material. Condensation of the vapor elastically deforms the material to close the voids.

FIG. 3 shows a variation of the invention, in which the reflecting surfaces are voids molded into a section of elastic transparent material 31. Vapor 32 fills the voids when hot, and light 33 is reflected. When cool, the vapor condenses, and the resulting vacuum closes the voids.

The panels illustrated in FIGS. 1, 2, 3, and 5 do not reflect light over a very wide angle, and would have to be mounted so that they could be tilted to face the sun squarely. If the panels had their long axes running East-West, only the varying declination of the sun would need be compensated for, and an adjustment every few weeks would suffice. Perhaps in some applications the panels could be fixed if it were sufficient to have optimum performance only at mid-summer, for instance.

During the rest of the year, some atenuation and scattering of the light would have to do.

Figure 4:
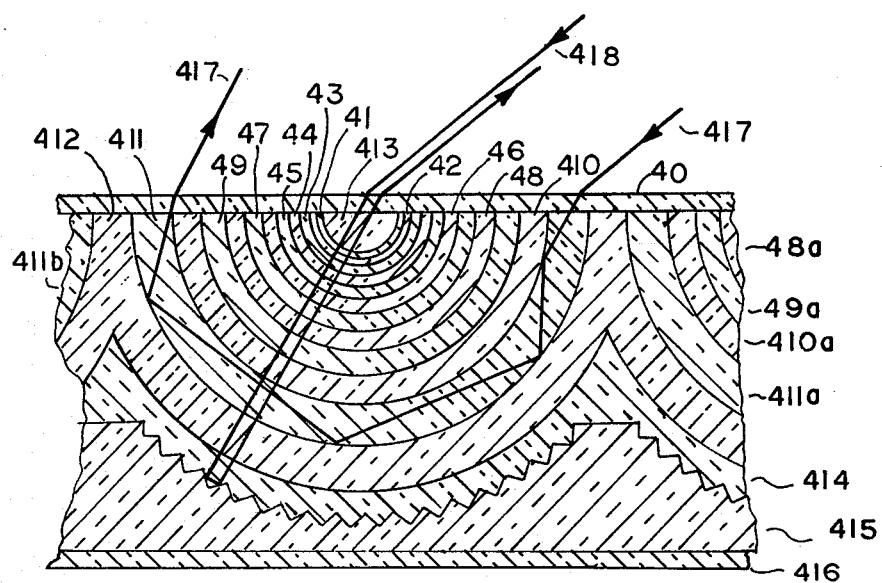
FIG. 4 shows a more complex optical system, which is reflective for any angle of incident light.

FIG. 4 shows an optical system which would reflect light from any angle. Concentric semi-spherical or semi-cylindrical shells 41 through 412 form light pipes. Light 417 incident from any angle will be returned out of the top of the panel, though not in any particular angle. The aperture of the shells 41 through 412 must be sufficiently small so that light incident at a steep angle cannot penetrate sufficiently to arrive at the intended point of first reflection at an angle less than the critical angle for the material. This aperture gets smaller and goes to zero at the center, making it impractical to include the center. For many applications the small amount of light passing through the center 413 could be ignored, but if it could not, right angle ridges as shown in layers 414 and 415 would return light 418 passing through the center 413.

The panel of FIG. 4 would preferably have layers 41 through 415 made of a soft elastic transparent material, and molded so that fairly large gaps existed between the layers. The shells 41 through 412 should touch only at their apertures, and layer 414 should touch adjacent layers 412 and 415 only between groups.

Outside layers 40 and 416 would preferable be a rigid material to give support to the panel and provide good parallel outside surfaces to the panel for good optical properties when transmitting light. The sealing means, not shown, would have to be flexible, as the panel would swell considerably in the hot, reflective state.

Figure 5:
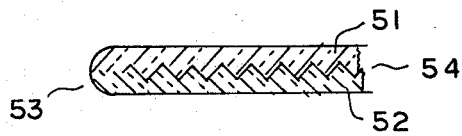
FIG. 5 shows the construction of a simple panel.

FIG. 5 shows how a simple panel might be constructed. Transparent layers 51 and 52 are heat welded or otherwise sealed at the edges 53. Fluid 54 fills the space between the layers 51 and 52.

If the layers of the panels are coated lightly with a releasing agent, and a vacuum were drawn between them, short exposure to high heat would allow the material to flow slightly and the panels would conform very well. Care would have to be exercised so as not to weld the layers together.

Figure 6:
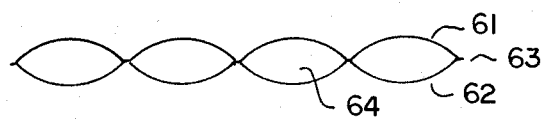
FIG. 6 shows a configuration in which the construction resembles an air mattress.

FIG. 6 shows a very simple embodiment of the invention. Top and bottom transparent layers 61 and 62 are sealed at the edges 63 as is an air mattress. The "mattress," is inflated with vapor 64. Although crude, it would be inexpensive, and could be hung in windows. The layers could be made with 90° ridges, but when inflated, only a portion of them would be normal to the light unless care were taken to minimize curvature. In this embodiment, it would probably be more practical to etch the inner surfaces. When hot (inflated), light would be scattered from both surfaces, much of it returning. When cool, the panel would be clear.

Figure 7:
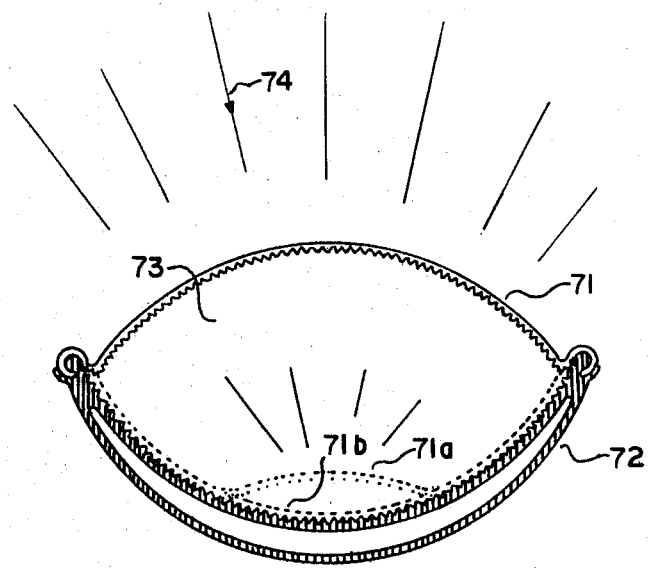
FIG. 7 shows an absorber such as might be used in a solar collector of the concentrating type. If the absorber gets too hot, the transparent layer is separated by vapor and becomes reflective.

FIG. 7 shows a first layer 71 of transparent material covering a collector 72. The first layer 71 and the collector 72 have intermeshing ridges shaped so that the first layer 71 is a reflector when distended and immersed in vapor 73. The collector 72 is shown as an extruded member having a conduit for heat transferring medium. This type of collector 72 would be suitable for a solar collector of the concentrating type having a linear condensing lens. In this case, if the focus of the lens were on the center of the collector 72, light rays 74 would be incident radially and would concentrate toward the center.

When the collector 72 were not too hot, the transparent layer 71 would contour to the collector 72 as indicated by dashed outline 71b. As the collector 72 began to overheat, a bubble 71 a would begin to form, and a portion of the light 74 would be reflected. When the transparent layer 71 was fully extended, the light 74 would be reflected everywhere.

I claim

1. A panel which may be transparent or reflective to light, depending upon temperature, comprising a first transparent layer, having a plane first surface, and having its second surface contoured so as to be a reflector due to internal reflection a second transparent layer, sealed at its edges to the first transparent layer and having its first surface contoured so as to closely fit the contour of the second surface of the first transparent layer, and having a plane second surface, and a fluid contained between the first transparent layer and the second transparent layer, the nature of the fluid being such that for a higher temperature the fluid is a vapor which separates the first transparent layer from the second transparent layer, resulting in internal reflection at the first transparent layer, and for lower temperatures the fluid condenses, creating a vacuum which draws the first transparent layer into close contact with the second transparent layer, providing an optical continuum through the panel and rendering the panel as a whole transparent, and the quantity of the fluid being carefully controlled so that when the fluid is totally vaporized, there is not sufficient vapor to distend the panel excessively.

2. A panel which is transparent or reflective to light depending upon temperature, comprising a sheet molded of elastic transparent material, and containing voids molded such that the interfaces between the elastic transparent material and the voids forms a reflective optical system due to internal reflection, and a fluid contained within the voids the nature of the fluid being such that for a higher temperature the fluid is a vapor filling the voids, and for a lower temperature the fluid condenses, creating a vacuum which collapses the voids providing an optical continuum through the panel and rendering the panel as a whole transparent, and the quantity of the fluid being carefully controlled so that when the fluid is totally vaporized, there is not sufficient vapor to distend the panel excessively.

3. A panel which is absorbing or reflective to light depending upon temperature, comprising a layer of flexible transparent material having a plane first surface, and having its second surface contoured so as to be a reflector due to internal reflection an absorbing surface, sealed at its edges to the layer of flexible transparent material, and having a surface contour which closely fits the contour of the second surface of the layer of flexible transparent material, and a fluid contained between the layer of flexible transparent material and the absorbing surface, the nature of the fluid being such that the fluid is a vapor at higher temperatures, which separates the layer of flexible transparent material from the absorbing surface, resulting in internal reflection at the layer of flexible transparent material, and at lower temperatures, the fluid condenses to a liquid, creating a vacuum which holds the layer of flexible transparent material in contact with the absorbing surface, providing an optical continuum to the absorbing surface and rendering the panel as a whole light absorbing, and the quantity of the fluid being carefully controlled so that when the fluid is totally vaporized, there is not sufficient vapor to distend the panel excessively.

4. A panel which may be transluscent or transparent as a function of temperature, comprising first and second layers of transparent material, sealed together at their edges, and having their respective contacting surfaces contoured so as to scatter transmitted light, and a fluid contained between the first and second layers of transparent material the nature of the fluid being such that at higher temperatures the fluid is a vapor separating the first from the second layer of transparent material, and at lower temperatures the fluid condenses to a liquid, creating a vacuum which holds the first and second layers of transparent material in close contact, so that there is optical continuity through the panel, and the panel as a whole becomes transparent, and the quantity of the fluid being carefully controlled so that when the fluid is totally vaporized, there is not sufficient vapor to distend the panel excessively.

5. A panel of the type having a first transparent layer which may either transmit or return incident light depending upon whether a fluid which was introduced into spaces within the panel is a condensate or a vapor, as a function of temperature, further comprising a non-volatile liquid, introduced with the fluid whereby the condensate of the fluid is extended, and the optical continuum of the panel is improved when the first transparent layer is in the transmitting state.

6. A method of filling with fluid the spaces within a panel of the type having a first layer which may either transmit or return incident light depending upon whether the fluid is a condensate or a vapor, as a function of temperature, comprising purging of the panel of air injecting a measured volume of the condensed fluid into the spaces within the panel, the measured volume of the condensed fluid being the quantity of the fluid which, when totally vaporized, will not excessively distend the panel, and sealing the panel to retain the fluid.

7. A method of improving a panel of the type having a first layer which may either transmit or return incident light depending upon whether a fluid within the panel is a condensate or a vapor as a function of temperature comprising adding a non-volatile liquid to the fluid whereby the condensate of the fluid is extended, and the optical continuum of the panel is improved when the first layer is in the transmitting state.

* * * * *